United States Patent [19]
Jee

[11] Patent Number: 4,679,598
[45] Date of Patent: Jul. 14, 1987

[54] SUBSEA PIPELINE BUNDLE

[75] Inventor: Trevor P. Jee, Seven Kings, England

[73] Assignee: The British Petroleum Company p.l.c., London, England

[21] Appl. No.: 839,961

[22] Filed: Mar. 17, 1986

[30] Foreign Application Priority Data

Mar. 20, 1985 [GB] United Kingdom ............... 8507192

[51] Int. Cl.$^4$ ............................................. G05D 7/00
[52] U.S. Cl. .................................. 138/103; 166/302; 166/306
[58] Field of Search ............ 138/103, 149, 111, 114; 166/302, 303, 306, 61, 57; 285/47

[56] References Cited

U.S. PATENT DOCUMENTS

| | | | |
|---|---|---|---|
| 345,586 | 7/1886 | Hall | 138/27 |
| 1,012,777 | 1/1911 | Wigle | 166/61 |
| 1,668,635 | 5/1928 | Stefani | 138/149 |
| 2,911,047 | 11/1959 | Henderson | 166/61 |
| 2,998,069 | 8/1961 | Stephens | 166/61 |
| 3,269,422 | 8/1966 | Matthews et al. | 138/111 |
| 3,420,277 | 1/1969 | Ceintrey | 138/146 |
| 3,563,825 | 1/1965 | Segura et al. | 138/149 |
| 3,866,670 | 2/1975 | Cramer et al. | 138/111 |
| 3,934,618 | 1/1976 | Henderson | 138/114 |
| 4,154,297 | 5/1979 | Austin | 166/302 |
| 4,194,536 | 3/1980 | Stine et al. | 138/111 |
| 4,523,644 | 6/1985 | Dismukes | 166/57 |

*Primary Examiner*—Stephen Marcus
*Assistant Examiner*—L. J. Peters
*Attorney, Agent, or Firm*—Morgan & Finnegan

[57] ABSTRACT

A tube bundle, suitable for the transportation of gas from a subsea wellhead, comprises (a) an insulated external casing, (b) an internal production line for gas, moisture and possibly oil or condensate and (c) an internal tube for carrying a heating medium through the bundle to its wellhead end. The heating tube has a tapered or stepped layer of insulating material with the insulation increasing in thickness in the direction away from the wellhead.

The combination of heating and carefully designed insulation is particularly effective in preventing hydrate formation in the gas line.

4 Claims, 3 Drawing Figures

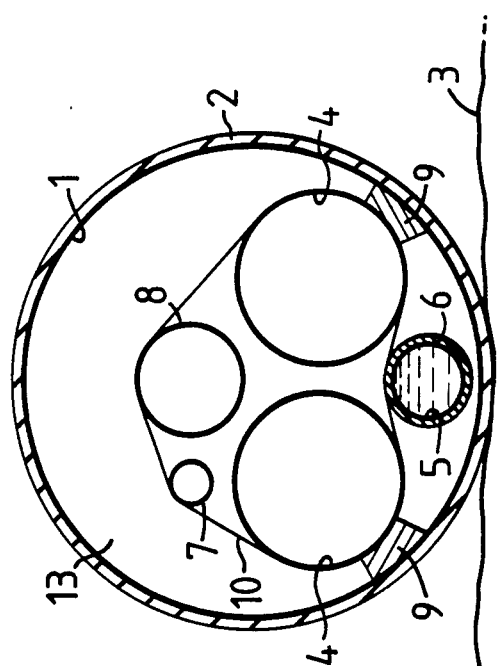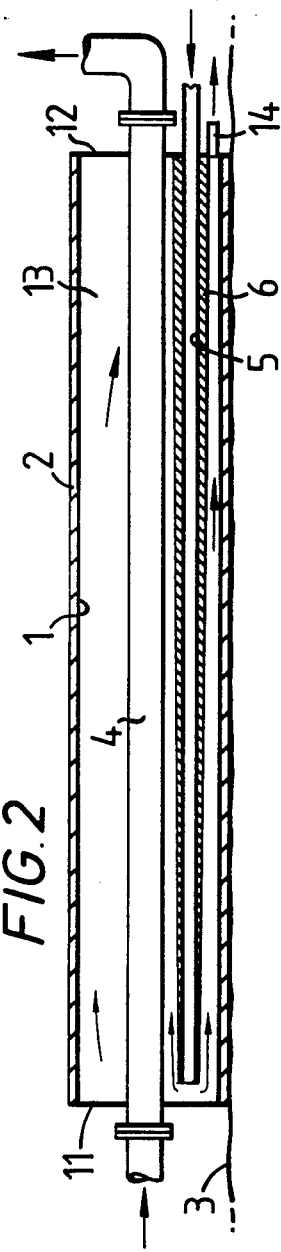

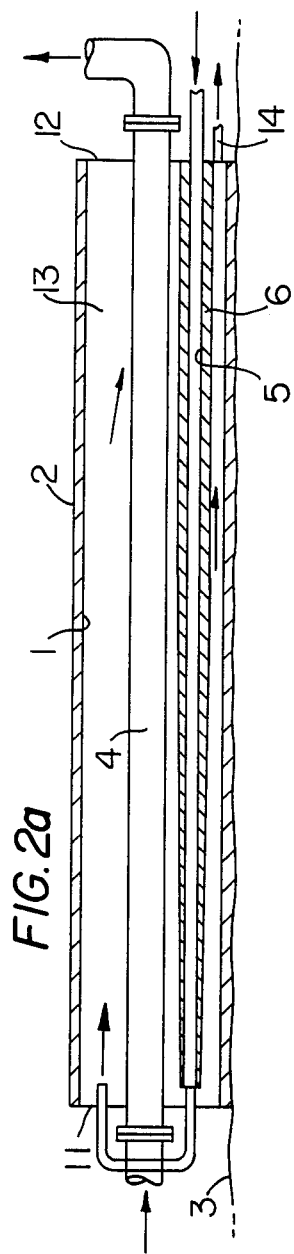

SUBSEA PIPELINE BUNDLE

This invention relates to a tube bundle suitable for the subsea transportation of gas.

Gas is sometimes to be found in association with condensate and/or moisture in offshore locations.

Various techniques exist for exploiting offshore gas reserves. For example, the well head and processing equipment may be located on a fixed platform.

Alternatively, and particularly for smaller and awkwardly shaped fields which cannot be reached from a single platform, the wellhead may be located on the sea bed. From the subsea wellhead, production lines under high pressure may lead to an offshore platform some distance away where treatment is effected.

Moisture associated with gas can give rise to problems. Under conditions of high pressure and low temperature a solid gas hydrate may be formed which can block pipelines. Gas as produced is normally at a sufficiently high temperature to be free from this risk, but on transportation through a subsea pipeline bundle, the temperature may drop rapidly and, unless precautions are taken, there is a distinct risk of gas hydrate forming.

One such precaution is the injection of methanol. Whilst this reduces the formation of hydrates, it introduces further operating difficulties since methanol forms an azeotrope with water.

Insulation of the production pipeline or outer casing may be insufficient in itself to alleviate the heat loss problem, particularly for longer lines.

We have now discovered that a combination of heating and carefully designed insulation on the heating tube is particularly effective.

Thus, according to the present invention, there is provided a tube bundle, suitable for the transportation of gas from a subsea wellhead, which tube bundle comprises (a) an insulated external casing, (b) at least one internal production line for gas, moisture and possibly oil or condensate and (c) an internal heating tube for carrying a heating medium through the bundle to its wellhead end, the heating tube having a tapered or stepped layer of insulating material with the insulation increasing in thickness in the direction away from the wellhead.

The heating tube may terminate open-endedly within the tube bundle or, alternatively, a loop may project beyond the tube bundle and return to it before opening.

Heating fluid is supplied from an external source and flows through the heating tube to the wellhead end of the tube bundle where it emerges from its tube and returns to source through the annulus between the external casing and the internal tubes for recycle.

The rate of heat transfer to the fluid in the annulus is designed to be the same as the rate of heat loss from the annular fluid to the sea—hence the annular fluid stays at constant temperature above sea temperature.

Suitable insulating materials include those which are resistant to water such as Neoprene rubber, epoxy resin based paints and polyurethane foam.

Suitable heating fluids include water, mixtures of water and glycol, and oil.

The provision of heat for the heating fluid is unlikely to be a problem, since in most bases involving offshore platforms, waste heat from gas turbines is readily available.

There is a risk of gas hydrates forming at temperatures below about 20° C. It is therefore preferred to keep the gas temperature about 40° C. or above to guard against sudden temperature drops caused by the Joule-Thompson effect if the gas undergoes depressurisation, for example, across a valve.

The invention is illustrated with reference to FIGS. 1, 2 and 2a of the accompanying drawings wherein FIGS. 1, 2 and 2a are sectional elevations of a tube bundle, not to the same scale, with FIG. 1 taken perpendicular to the bundle axis and with FIGS. 2 and 2a taken parallel to the bundle axis.

With reference to FIG. 1:

The tube bundle comprises a 90 cm casing 1 surrounded by a 1.25 cm thick layer 2 of Neoprene rubber as insulation lying on the sea bed 3. The casing contains two 35 cm gas production lines 4, a 15 cm water heating tube 5 surrounded by a tapering layer 6 of Neoprene rubber insulation, a 10 cm well kill line 7 and a 20 cm test line 8.

The well kill line 7 is a service line which when necessary conveys drilling mud from an offshore platform to the wellhead.

The production lines 4, the well kill line 7 and test line 8 are supported by rollers 9 and strap 10.

The test line 8 may be used for isolating production from an individual well if a number of these feed the system. If not used for testing it may serve as an additional production line.

With reference to FIG. 2:

Lines 7 and 8, and rollers 9 and strap 10 have been omitted for reasons of clarity.

The insulation 6 on line 5 tapers from zero at the wellhead end 11 to 1.25 cm at the other end 12, the platform end 5 distant. Hot water enters the line 5 at the platform end 12 and passes down the line, losing heat at a constant rate to the annular fluid. Line 5 is open ended at the wellhead end 11 so that warm water emerges from it and passes into the annulus 13 between the casing 1 and the rest of the tubes. The annular fluid loses heat through the casing 1 but gains heat from line 5 and therefore remains at constant temperature. Warm water emerges from the bundle by the line 14 and is returned to the platform for heating and recycle.

With reference to FIG. 2a:

An alternate embodiment of FIG. 2 is shown in FIG. 2a wherein a loop projects beyond the tube bundle and returns to the tube bundle before opening. As shown in FIG. 2a, heating tube 5 projects through the end plate at the wellhead end 11 of the tube bundle and loops back into the end plate before opening within the tube bundle.

I claim:

1. A tube bundle, suitable for the transportation of gas from a subsea wellhead, which tube bundle comprises (a) an insulated external casing, (b) at least one internal production line, and (c) an internal heating tube for carrying a heating medium through the bundle to its wellhead end for discharge into the casing and return therethrough, the heating tube having a tapered or stepped layer of insulating material with the insulation increasing in thickness in the direction away from the wellhead.

2. A tube bundle according to claim 1 wherein the heating tube terminates open-endedly with the tube bundle.

3. A tube bundle according to claim 1 wherein the heating tube projects through the end plate at the wellhead end of the tube bundle and loops back through the end plate before opening within the tube bundle casing.

4. The tube bundle according to claim 1 wherein the tapered or stepped layer of insulating material is such that the rate of heat transfer to a fluid in the annulus is the same as the rate of heat loss from the annular fluid to the sea.

* * * * *

UNITED STATES PATENT AND TRADEMARK OFFICE
CERTIFICATE OF CORRECTION

PATENT NO. : 4,679,598

DATED : July 14, 1987

INVENTOR(S) : Trevor P. Jee

It is certified that error appears in the above-identified patent and that said Letters Patent is hereby corrected as shown below:

Column 1, line 62, "bases" should be --cases--.
Column 2, line 30, between "5" and "distant" insert the abbreviation for kilometer --km--.
Claim 4, the first word "The" should be --A--.

Signed and Sealed this

Seventeenth Day of November, 1987

Attest:

DONALD J. QUIGG

Attesting Officer

Commissioner of Patents and Trademarks